May 13, 1930.　　　　J. R. McWANE　　　　1,758,454

CAST IRON PIPE.

Filed Jan. 21, 1925

James R. McWane
INVENTOR

WITNESSES
L. Goodman
Howard D. Orr

BY
ATTORNEY

Patented May 13, 1930

1,758,454

UNITED STATES PATENT OFFICE

JAMES R. McWANE, OF BIRMINGHAM ALABAMA, ASSIGNOR TO McWANE CAST IRON PIPE COMPANY, OF BIRMINGHAM, ALABAMA, A CORPORATION OF ALABAMA

CAST-IRON PIPE

Application filed January 21, 1925. Serial No. 3,830.

This invention relates to improvements in cast iron pipe and especially to the formation of the spigot ends thereof.

An object is to provide means at the spigot ends of cast iron pipe sections which will readily permit the same to be placed into the usual bell end, in joining the sections together, said means being adapted to receive portions of the usual jute and lead calking material used in such joints, so as to prevent the spigot end from being pulled longitudinally from its seat in said bell, either from the effects of internal pressure or from the effects of falling or sagging of the pipe line, and also to prevent any turning of one pipe section relatively to an adjacent section.

A further object is to provide a spigot end construction for cast iron pipe, which may be incorporated without additional labor or increase of the amount of material, and to avoid weakening the pipe at the point of connection, or effecting the leak-proof joint in any way, said improvement being especially adapted for use in conjunction with the pipe joint shown and described in Patent #1,486,777, issued to me on March 11, 1924, on precalked joint for cast iron pipes and method of making same.

A full and complete understanding of the invention may be obtained from a consideration of the following detailed description, taken in connection with the accompanying drawing forming a part of this specification; it being understood that while the drawing shows a practical form of the invention, the latter is not to be confined to strict conformity with the showing thereof, but may be changed or modified, so long as such changes or modifications mark no material departure from the salient features of the invention, as specifically pointed out in the appended claims.

In the drawing, in which similar reference characters designate corresponding parts throughout the several figures.

Figure 1:
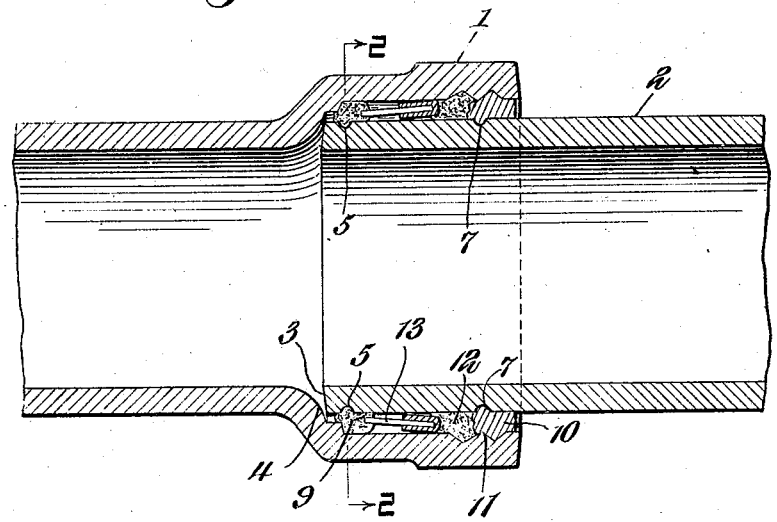
Figure 1 is a longitudinal section through a pipe joint, such as that disclosed in the above mentioned patent, and showing the present invention in conjunction therewith.

Referring to the drawing, there is shown a pipe joint consisting of the usual bell 1 of one pipe section, and having jointed thereto the spigot 2 of the adjacent pipe section, by the improved, pre-calked pipe joint method of the above mentioned patent, a detailed description of which is not deemed necessary in the present application.

Figure 2:
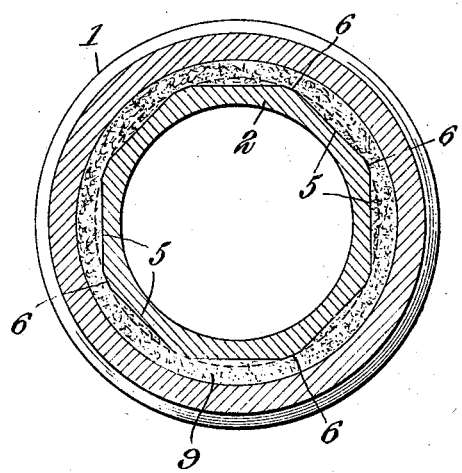
Figure 2 is a transverse section taken on the line 2—2 of Figure 1.
Figure 3:
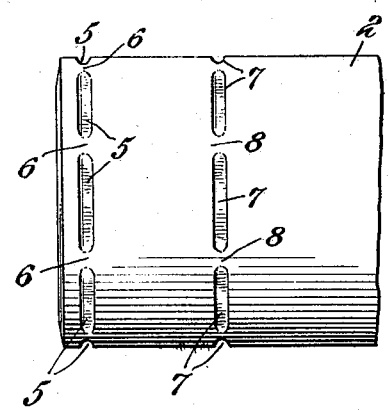
Figure 3 is a side elevation of the spigot end portion of a pipe having the improvement incorporated therein.

According to the invention, a spigot is provided having no terminal bead, the end being cut square and slightly bevelled, as indicated at 3, to abut against the internal shoulder 4 of the socket within the bell. The spigot is provided, close to the bevelled end 3, with a circumferential series of circumferentially alined grooves 5, preferably eight in number and extending entirely around the spigot, in end to end relation, the ends of the grooves being slightly spaced apart to leave webs 6 of the original thickness of the pipe. The grooves 5 are all straight, extending only partially through the wall of the spigot so as to avoid unduly weakening the same, the deepest portion of the groove being at the mid points and having a depth, preferably only about one-fourth of the thickness of the pipe. The bottoms of the grooves are round in cross section, as shown in Figure 1 of the drawing, and said bottoms are straight across from end to end of the groove, transversely of the pipe, and arranged tangential to the pipe and perpendicular to radial lines drawn through the center thereof. This formation defines a groove which is deepest at its longitudinal center and gradually diminishes in depth towards its ends, thus obtaining the desired result, in effect, of a continuous, circumferential groove, for the reception of calking material in the joint, without unduly weakening the spigot. In addition to this, the straight bottoms of the alined grooves act as facets to impinge the calking material and to prevent any rotary movement of the spigot within the bell, as is clearly shown in Figure 2 of the drawing.

Spaced from the aforesaid series of grooves 5 adjacent to the end of the spigot, is a second series of grooves 7 arranged in precisely the same manner and having the same size, shape and proportions, but the ends of the grooves defining the intervening webs 8 being, preferably, but not necessarily in alinement with the aforesaid webs 6, longitudinally of the pipe section.

When the improved spigot is placed into the bell 1, as the joint is made with the pre-calked form illustrated, the bevelled end 3 of said spigot abuts against or is in juxtaposition to the shoulder 4 of the socket, and this properly alines the terminal series of grooves 5 in position to be engaged by the jute or other similar material 9, which is already arranged within the socket, being thrust against shoulder 9a. At the same time the second series of grooves 7 are located in a position to be entered by the lead packing 10 of the joint, which has been previously partially calked, as at 12. When the lead is further calked in the usual maner, the same is deflected inwardly towards the wall of the spigot end, by the internal, inclined annular wall 11, and the said lead is forced to enter the outer series of grooves 7 and securely lock the spigot within the bell against any longitudinal or rotary movement, and serves in conjunction with the inner jute 9, outer jute 12 and the interposed wedges 13, to seal the pipe joint.

From the foregoing it will be seen that a simple and inexpensive means has been incorporated in the structure of spigot ends of cast iron pipe without sacrificing any of the strength thereof, facilitating the making of pipe joints especially with the pre-calked form of joint, and that said means is so designed as to enable the pipe to be readily coupled up to the bell end of the adjacent pipe for co-action with the parts of the said pre-calked joint, the improvement serving to prevent the separation of the pipe sections and the rotary movement of one section relatively to the other.

What is claimed is:

1. A cast iron pipe having a spigot end of the same diameter as the pipe proper, said end being formed with two spaced series of circumferentially-alined relatively-short grooves, the end series being adapted to receive the jute or other material when in a pipe joint, and the other series to receive the lead of said joint, said grooves of both series being spaced apart circumferentially to provide interposed abutments of the original thickness of the pipe for strengthening the same and to prevent rotary movement of the spigot within the bell of such joint.

2. A cast iron pipe having a beadless spigot end and cast with a series of spaced, circumferentially, alined grooves for the reception of calking material in a pipe joint, each groove being spaced from the others to provide strengthening portions of the original thickness of the pipe, and said grooves extending perpendicular to radial lines through the axis of the pipe.

3. A pipe joint comprising, in combination; a bell having an internal shoulder; a spigot of uniform diameter and having a series of grooves formed therein adjacent its end, said grooves being straight longitudinally and separated so as to provide webs of the original thickness of the pipe; the grooves being arranged in two circumferential series spaced longitudinally of the spigot, and having the webs alined longitudinally of the spigot; and calking material interposed between the internal shoulder of the bell and the series of grooves on the spigot, said calking material entering the grooves and tending to prevent any turning of the spigot within the bell.

In testimony, that I claim the foregoing as my own, I have hereto affixed my signature.

JAMES R. McWANE.